US008220054B1

(12) United States Patent
Lu

(10) Patent No.: US 8,220,054 B1
(45) Date of Patent: Jul. 10, 2012

(54) PROCESS EXCEPTION LIST UPDATING IN A MALWARE BEHAVIOR MONITORING PROGRAM

(75) Inventor: Chien Hua Lu, Taipei (TW)

(73) Assignee: Trend Micro, Inc., Tokyo (JP)

( * ) Notice: Subject to any disclaimer, the term of this patent is extended or adjusted under 35 U.S.C. 154(b) by 918 days.

(21) Appl. No.: 12/262,491

(22) Filed: Oct. 31, 2008

(51) Int. Cl.
*G06F 11/00* (2006.01)
(52) U.S. Cl. .......... 726/24; 726/22; 726/23; 726/25; 713/340; 713/375; 709/224
(58) Field of Classification Search .......... 726/24
See application file for complete search history.

(56) References Cited

U.S. PATENT DOCUMENTS

| | | | | |
|---|---|---|---|---|
| 6,349,335 | B1 * | 2/2002 | Jenney | 709/224 |
| 7,124,197 | B2 * | 10/2006 | Ocepek et al. | 709/232 |
| 7,664,754 | B2 * | 2/2010 | Shipp | 726/24 |
| 7,917,008 | B1 * | 3/2011 | Lee et al. | 386/291 |
| 2003/0037132 | A1 * | 2/2003 | Abdollahi et al. | 709/223 |
| 2004/0073657 | A1 * | 4/2004 | Palmer et al. | 709/224 |
| 2006/0217115 | A1 * | 9/2006 | Cassett et al. | 455/423 |
| 2006/0242282 | A1 * | 10/2006 | Mullarkey | 709/223 |
| 2007/0011661 | A1 * | 1/2007 | Itoh | 717/127 |
| 2007/0240215 | A1 * | 10/2007 | Flores et al. | 726/24 |
| 2007/0286198 | A1 * | 12/2007 | Muirhead et al. | 370/392 |
| 2008/0077994 | A1 * | 3/2008 | Comlekoglu | 726/27 |
| 2008/0214299 | A1 * | 9/2008 | Smith et al. | 463/29 |
| 2009/0252040 | A1 * | 10/2009 | Kocaturk | 370/241 |
| 2009/0293122 | A1 * | 11/2009 | Abdel-Aziz et al. | 726/23 |

* cited by examiner

*Primary Examiner* — Thuong Nguyen
*Assistant Examiner* — Arvin Eskandarnia
(74) *Attorney, Agent, or Firm* — Beyer Law Group LLP

(57) ABSTRACT

Generating an exception list by a service provider for use in behavior monitoring programs for malware detection is described. A feedback server controlled by a malware prevention service provider receives client process reports from client devices owned by the service provider's customers and others using the provider's behavior monitoring software. The process reports contain data on processes that were evaluated (on the client device) as being processes that require a significant amount of CPU resources (i.e., above a certain threshold) to monitor and that have previously executed on the client device and were considered safe or non-harmful to the device. The feedback server receives the process reports and creates a statistics summary report, which is used by the service provider in evaluating whether to include the processes in the provider's official exception list which is distributed to its customers for use in their behavior monitoring programs. While creating the process reports on the client devices, the devices are able to temporarily address issues caused by processes taking up too much of the behavior monitor's CPU usage by including the process on exception list only for that client. The final decision as to whether the process will be on the final or official exception list is made by the service provider.

32 Claims, 9 Drawing Sheets

PROCESS EXCEPTION LIST UPDATING IN A MALWARE BEHAVIOR MONITORING PROGRAM

BACKGROUND OF THE INVENTION

1. Field of the Invention

The present invention relates to computer malware prevention systems and software. More specifically, it relates to improving behavior monitoring methods for detecting malware on computing devices.

2. Description of the Related Art

Behavior monitoring is a methodology in the field of malware detection that does not require recognizing malware "signatures" or patterns. Nor does it require searching files for code or content that may be part of a virus or other type of malware. In contrast to these conventional signature-based malware defenses, behavior monitoring observes activities of all or most processes that executes on a computing device in real-time and searches for malicious or unusual activity or behavior to determine whether malware is present. Determining whether certain activity is malicious or suspicious typically requires examining all the processes that occur on the device. That is, generally everything that happens on the device is examined and if any of the activity looks suspicious, the code (i.e., process) causing the activity is analyzed and may be reported as malware. However, if a process is on a list of exceptions (so-called "white list") then the process is presumed to be safe will not be flagged as potential malware.

An important issue with this type of behavior monitoring is CPU performance on the device, such as a PC. Some applications, especially in the operating system, such as file I/Os, generate hundreds of processes resulting in a large volume of activity. Behavior monitors check the activities generated by these processes one by one, and check to see if they are potentially malicious. This results in very high CPU usage. The exception list is intended to mitigate this problem. Any activity that is generated by a process that is on the exception list is skipped by the behavior monitor to reduce CPU usage. However, updating the exception list requires both human, computational, and network resources. Current solutions for updating an exception list may be characterized as passive and are prone to error. Some of the problems that arise include:

1) enumerating all processes or applications that have good reputations is infeasible;

2) it is a burden to service provider "support teams" to identify which processes or application generate large volumes of intense activities and then build new patterns based on these activities to include in the exception list (the "service provider" being a company that provides behavior monitoring software to the public); and 3) customers have to wait for the most recently updated exception list in order to solve current CPU and other performance issues (e.g., a support team sends samples of "safe" processes to a pattern team; the pattern team prepares and releases the official exception list of processes to all clients).

SUMMARY OF THE INVENTION

Behavior monitoring programs operate on various types of computing devices to protect such devices from infection by software viruses and various types of malware. These programs monitor the behavior of processes that execute on a device and include an "exception list" which contains names of processes that are considered safe and do not have to be monitored, thereby saving CPU resources of the client device. These exception lists are updated with new processes by a service provider (typically the same entity that provides the behavior monitoring program) and are periodically distributed to its customers.

In one embodiment, a method of automatically updating an exception list to include safe processes is described. A feedback server (under the control of the service provider) receives client process reports from multiple client devices, for example, over a network such as the Internet. A client process report is created on a client device and contains data on processes that have executed on that client device and have been evaluated by the client to be a possible candidate for placement on the official exception list distributed by the service provider. The data in the report may include CPU usage data, origin and geographic data, and other information that the service provider may use in determining whether to include the processes in the exception list (which the service provider will disseminate to its behavior monitoring program customers).

The service provider creates a statistics summary report by analyzing the client process reports that it receives. It then determines whether to add a process to its official exception list. A uniform format of the client process report facilitates the generation of the statistics summary report which contains data relevant to deciding whether to include a process in the provider's exception list. The service provider uses its expertise, experience, and judgment in examining the summary report and ultimately deciding whether to include a particular process in its official exception list, which is an important decision given that once the process is on the exception list, the behavior monitor program, used by the provider's customers, will not check the activity of that process for suspicious or unusual behavior.

On the client device side, during the process of creating a client process report, the behavior monitoring program is able to address the problem of certain processes using up too many CPU resources on the client device. On a particular client device, processes that are being monitored by the behavior monitoring program that require too much CPU time (e.g., performing extensive file I/O operations) may be temporarily placed on the exception list only on that client device. Software modules in the behavior monitoring program check to see which monitoring of processes is consuming too much CPU time on the client. They then check which of those processes have previously executed on the client device and have done so safely, without harming the device, by checking an activity history database (a component of the behavior monitoring program). Those processes that meet these criteria are placed, in real time (i.e., immediately), on the client device's exception list, thereby providing a temporary solution to the high CPU usage problem the processes are causing at that time. They are also placed, more or less concurrently, on a client process report, as described above, and sent to the service provider's feedback server for analysis and an ultimate determination of whether the processes should be on the official exception list that is sent to all the customers.

In one embodiment, a behavior monitoring feedback server includes various components, in addition to the conventional processor and network interface. These components include a process report analysis engine for examining client process reports and generating statistic summary reports. There is also a memory storage area for storing the client process reports, the statistics summary reports, as well as the exception lists. In another embodiment, the behavior monitoring program residing on the client devices includes an activity analyzer, a process report generator, an exception list update module, and a behavior monitor processor usage measuring component.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Systems and methods for automatically identifying processes on a computing device which are suitable candidates for being included on an official exception list used in behavior monitoring programs are described in the figures. A behavior monitoring program (also referred to as a "service") is one type of malware prevention software that runs on computing devices, typically PCs, and monitors, in real time, the behavior caused by the execution of processes on the device. A process executing on a device (depending on the device, there may be hundreds of processes executing at once) causes activity which has a particular behavior. This behavior is examined by the behavior monitoring program by comparing the behavior to malware policies to see if a specific process is potentially malware. Behavior monitoring programs have an exception list, essentially a list of safe processes, which is used by the monitoring program to reduce the monitoring load. That is, if a process is on the exception list, its behavior does not have to be monitored.

Figure 1:
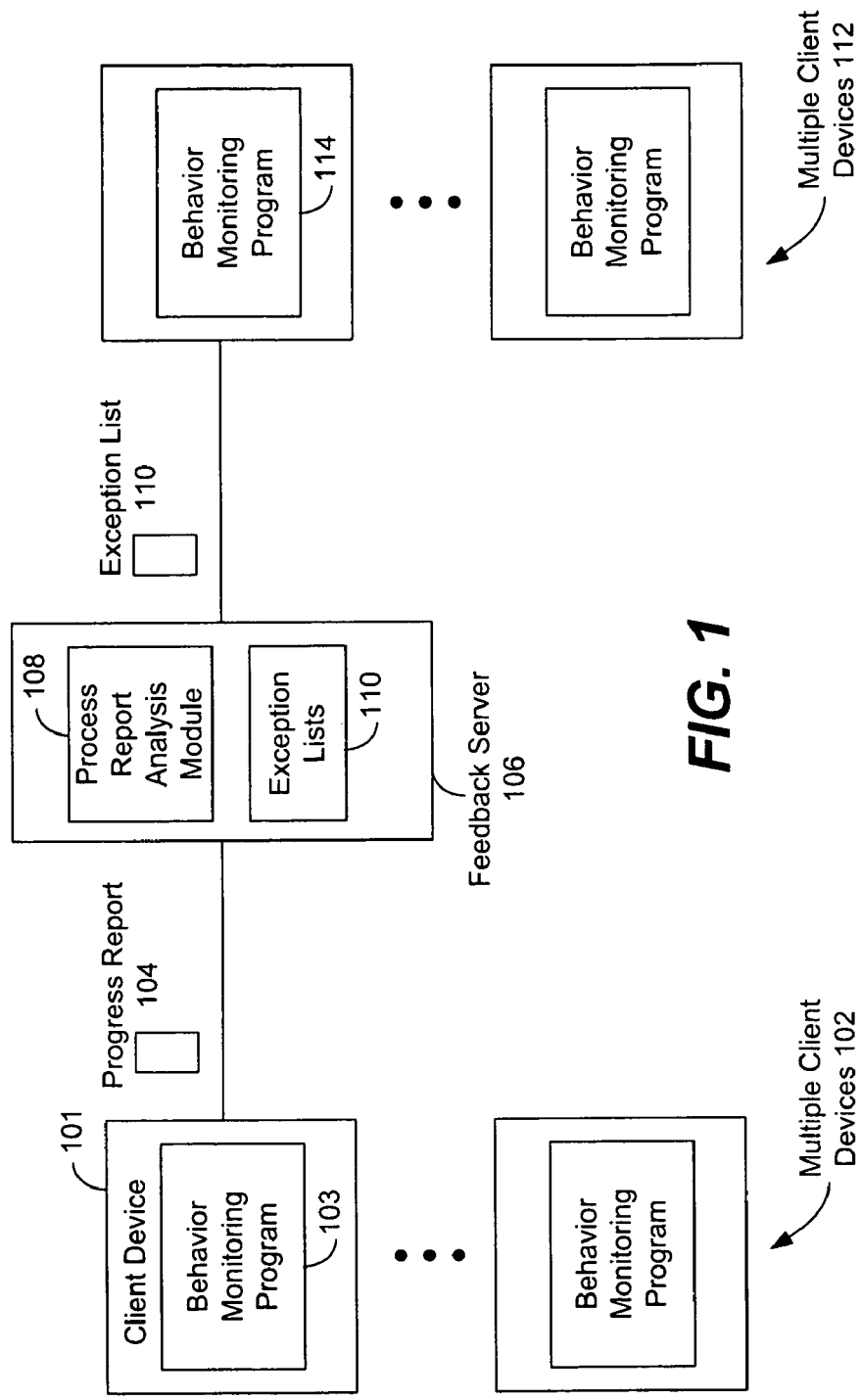
FIG. 1 is an overview block diagram of components relevant to various embodiments of the present invention.

FIG. 1 is an overview block diagram of components relevant to various embodiments of the present invention. A client device 101, such as a PC or mobile computing device, executes a behavior monitoring program 103. To better show the overall context, multiple client devices 102, are shown, each executing a behavior monitoring program as part of their virus prevention strategy. Client devices 102 may include mobile devices, notebook computers, handsets and cell phones, tablet computers, and other computing devices, many of which are able to connect to a network and share information with other devices. Multiple computing devices 102 may include any of these types of devices. In the description below, client device 102 is a computing device having a CPU or processor and may be referred to simply as a client. A behavior monitoring program or service is available under the commercial name "Unauthorized Change Prevention Service" and is provided by Trend Micro, Inc. of Cupertino, Calif. Specific components of behavior monitoring program 103 are described below.

Client device 101 transmits a process report 104 to a feedback server 106 via a network connection 108 as do other clients within multiple client devices 102, although not necessarily over the same network connection. Process report 104 contains data on one or more processes meeting certain criteria, described below. In one embodiment, network 108 is the Internet, but may be any suitable wired or wireless network connection, such as a VPN, Intranet, an Ethernet-based network, wireless Internet via a cell phone carrier, and others. Each client device transmits process report 104 to feedback server 106. Feedback server 106 operates under control of a service provider, typically the same entity that provides behavior monitoring program 103 (e.g., Trend Micro). In one embodiment, the behavior monitoring program on client devices 102 is from the same service provider. In another embodiment, the program may be from different providers. However, in the various embodiments, each program needs to get updated exception lists (among other updates not relevant to the present invention). Behavior monitoring programs 103 may be from one or more vendors and the entity operating or managing feedback server 106 may be the same entity that provides (i.e., sells, licenses, etc.) program 103 and related services to facilitate operation of behavior monitor program 103. A user of client device 101 running behavior monitoring program 103 may be described as "customers" or "subscribers" of the entity that operates feedback server 106.

Feedback server 106 includes a report analysis module 108 and one or more exception lists 110. Report analysis module 108 examines process report 104 received from client devices 101 and reports from multiple client devices 102. Exception list 110 identifies processes or, more generally, activity exception data incorporated into and utilized by behavior monitoring program 103, as described below. Feedback server 106 transmits an official exception list 110 containing the most recent updates regarding safe processes to computing devices 112 for use by behavior monitoring programs 114. In one embodiment, exception list 110 is transmitted to the same multiple client devices 102 that transmitted process reports to feedback server 106. In other embodiments, exception list 110 may be transmitted to a more expansive set of client devices where devices which did not send process reports to feedback server 106 may still receive an exception list for use by behavior monitor programs.

Figure 2:
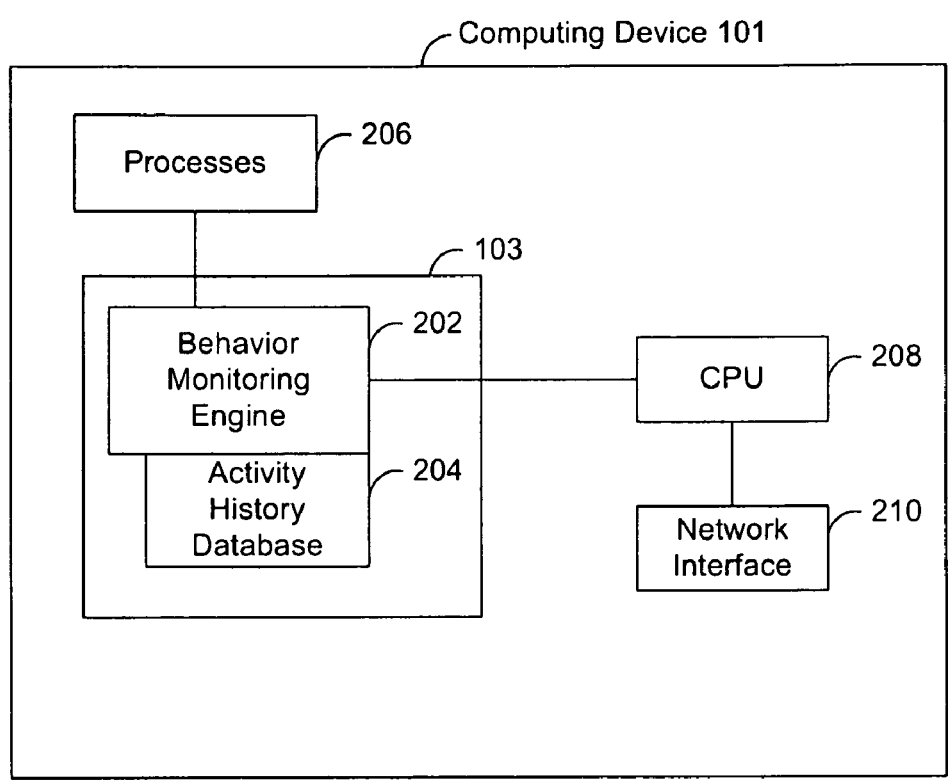
FIG. 2 is a logical block diagram showing a behavior monitoring program and relevant components and data that interface with the program in accordance with one embodiment.

FIG. 2 is a logical block diagram of a client 101 showing behavior monitoring program 103 and relevant components and data that interface with program 103 in accordance with one embodiment. Behavior monitoring program 103 includes a behavior monitoring engine 202 and an activity history database 204. An activity history database contains historical data on previous processes that may have occurred on the client device and is needed for a stateful behavior monitoring program. Database 204 and engine 202 are conventional components of program 103. For example, it may store that process A reads file 1 three times, process B reads file 2 five times, a new thread XY was created, connections to port M was made, and the like. Other relevant data may include the number of events that comprise a process and event type (e.g., file I/O, registry access). Activity history database 204 contains data on the behavior of processes that execute on the device. For example, it may store process identifiers and data indicating whether the process is malware or normal. Database 204 is described in greater detail below. As noted, engine 202 and database 204 presently exist in conventional behavior monitor programs. Engine 202 interfaces with executing processes 206 that occur in client device 101 and may be characterized as the main or critical functional component of behavior monitoring program 103. Specifically, monitoring engine 202 examines processes 206 executing on device 101. Engine 202 also interacts with client device CPU 208 to obtain data relating to usage of CPU 208 as related to behavior monitoring program 103. Components for CPU usage measuring are described in FIG. 3. Also included in client device 101 is a network interface 210 to enable communications with network components, such as feedback server 106.

Figure 3:
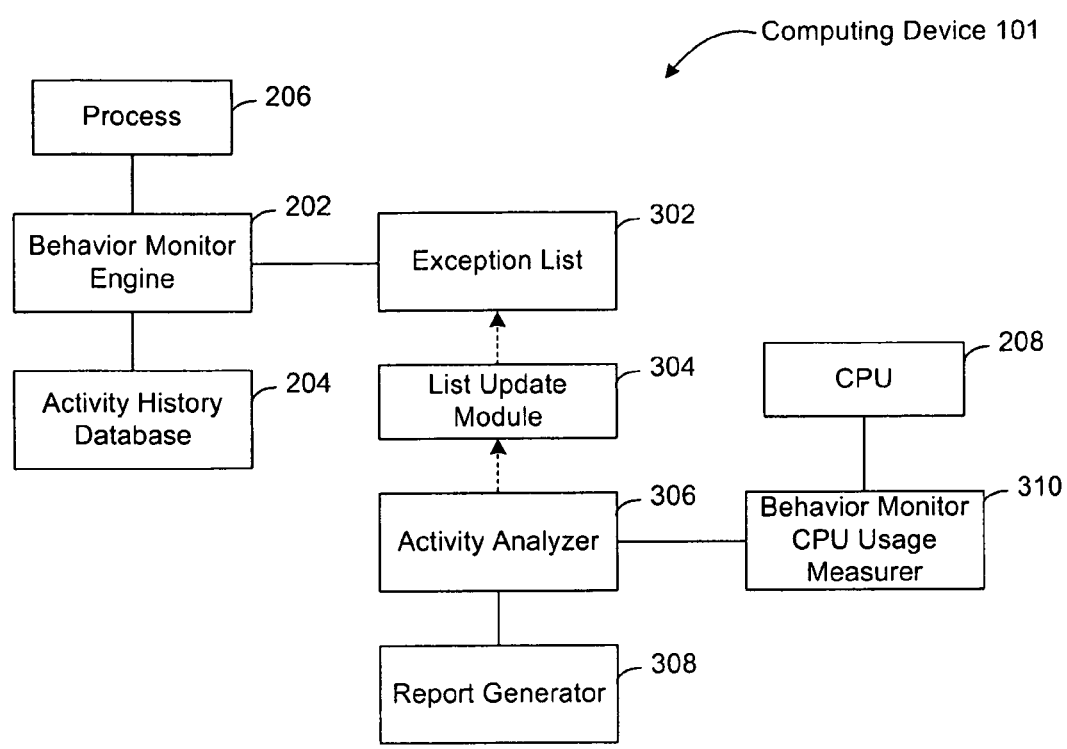
FIG. 3 is a logical block diagram showing further detail of a behavior monitoring program in accordance with one embodiment.

FIG. 3 is a logical block diagram showing further detail of behavior monitoring program 103 in accordance with one embodiment. As shown in FIG. 2, behavior monitoring engine 202 is able to detect or interface with processes 206 executing on client device 101. Engine 202 also interfaces with activity history database 204. Other components and data of behavior monitoring program 103 include exception list 302, a list update module 304, an activity analyzer 306, a report generator 308, and a CPU usage measurer 310. CPU usage measurer 310 interfaces directly with CPU 208 of client device 101. Activity analyzer 306 is a software component in behavior monitor program 103 that evaluates high CPU processes and determines whether a process should be placed on an exception list on the client device and included in process report 104 sent to feedback server 106.

Figure 4:
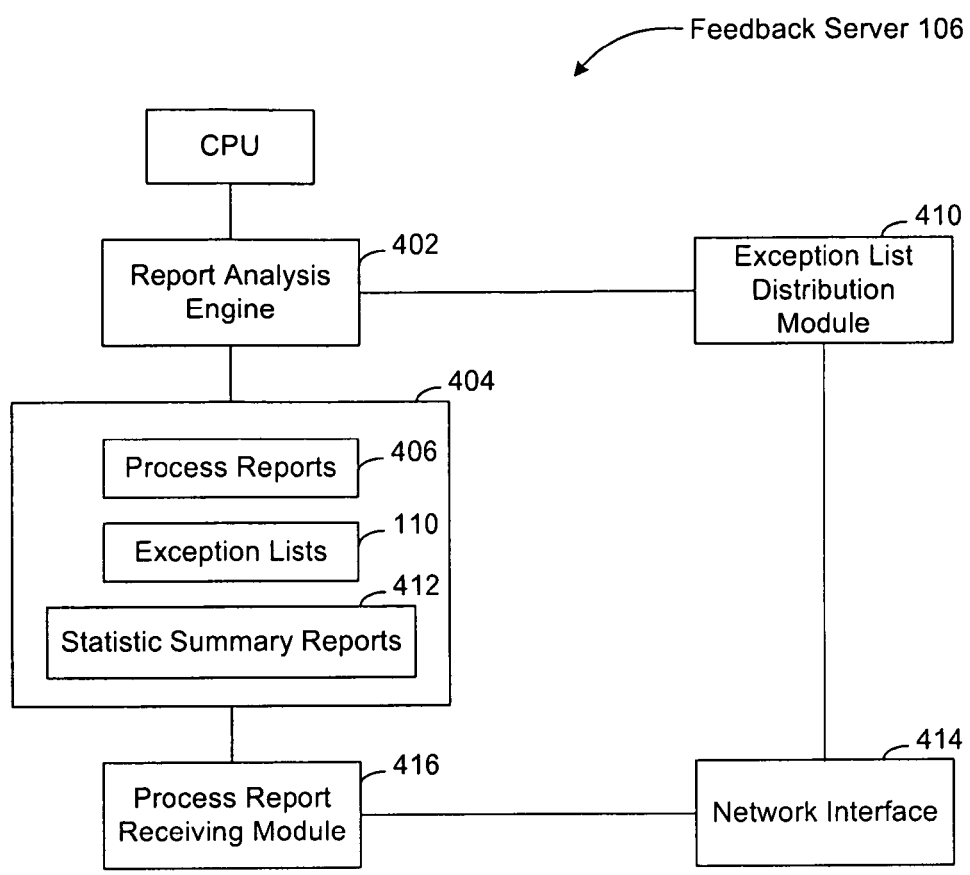
FIG. 4 is a block diagram showing components of a feedback server in accordance with one embodiment.

FIG. 4 is a block diagram showing components of feedback server 106 in accordance with one embodiment. Report analysis module 108 (not shown) contains a report analysis engine 402 that examines process reports received from client devices 102. Process reports are received from multiple client devices 102 by a process report receiving module 416 and stored in a storage area 404. Also stored in storage area 404 is exception list(s) 110, as initially shown in FIG. 1). Storage area 404 stores multiple process reports 406 (an individual process report shown initially as report 104 in FIG. 1. Process report 104 includes various types of data relating to the processes and applications contained in the report, including application name and version, maker or publisher of the application, a digital signature of the application, a checksum, CPU usage data, and other signatures. In other embodiments, the report may also include performance impact level data, where a level 1 impact indicates minimal CPU usage and a level 5 indicates that CPU usage is high. An example format of process report 104 may be the following:

<Application name_"TestSample.exe" version="1.2.4">
<Performance Impact level>4</Performance Impact level>
<Publisher>Tester</Publisher>
<Digital Signature>Tester Lab</Digital Signature>
<SHA1>2a66639d788 ccb2eb991c72e77cafefa32a50838<SHA1>
<MD5>f5f7f131c7fb5eaddf9f86b3a33c8a53<MD5>
<File Size>3645508</File Size>
</Application>

Exception lists 110 are transmitted to client devices for use in behavior monitoring programs. Exception lists 110 are distributed to multiple client devices 112 using a list distribution module 410 in feedback server 106. Module 410 may have access to a directory of addresses of client devices (or of customers/subscribers) receiving the exception list. This directory (not shown) may also be stored in storage area 404. Also stored in storage area 404 are statistic summary reports 412 which are derived from process reports 406 and used to determine which processes should be on an official exception list. Feedback server 106 also includes a network interface for communicating with other components, such as client devices 102 and 112. For example, interface module 414 provides the means for report receiving module 416 to receive process reports and for list distribution module 410 to transmit exception lists to client devices.

Figure 5:
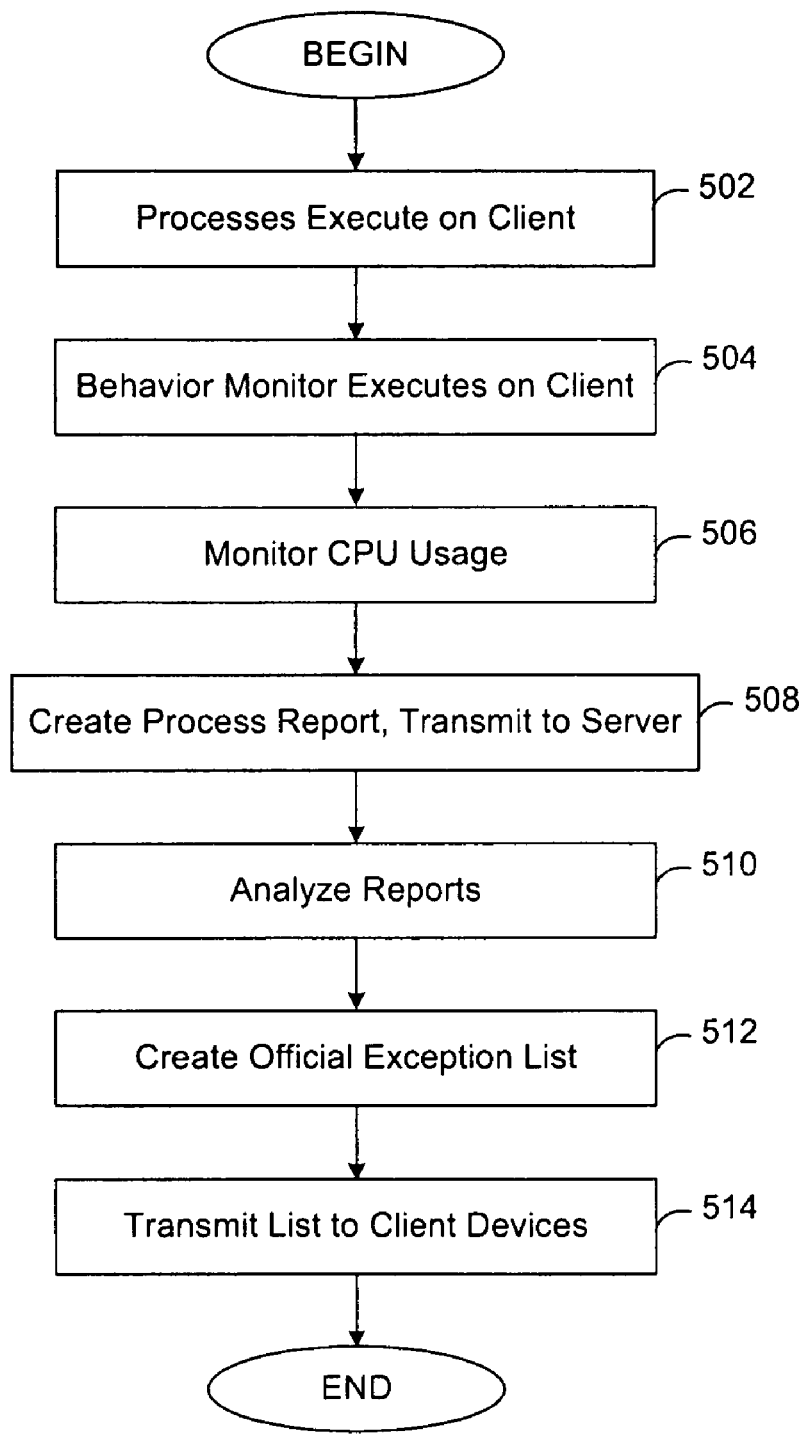
FIG. 5 is an overview flow diagram showing various steps of the present invention in accordance with one embodiment.

FIG. 5 is an overview flow diagram showing various steps of the present invention in accordance with one embodiment. At step 502 occurs during normal operation of a client device where processes execute in a typical manner. For ease of illustration, one client device is examined. At step 502 may occur on multiple client devices 102 concurrently. Processes execute typically as part of user applications, routine operating system activity, kernel space activity, drivers, and various other applications and code. There is, of course, a wide range of such applications and code, especially taking into consideration the various types of client devices, including PCs, cell phones, media players, mobile or hand-held computing devices, and others. As processes execute on a client device 101, behavior monitoring program 103, at step 504, also executes on device 101. Malware behavior monitoring may be a continuous operation, may occur at times selected by the user or at times determined by the program itself (on the other hand, routine processes of step 502 are typically executing at all times when the device is powered on).

At step 506 CPU usage by the behavior monitor is measured. Behavior monitoring program 103 expends CPU resources (i.e., cycles) of the client device by executing its primary function, that is, monitoring the activity of processes on the device as described in step 502. For example, of the total CPU usage by the behavior monitor, a certain percentage (e.g., 35%) of the total may be spent monitoring the activity of a particular process. Thus, while behavior monitor program 103 itself is monitoring the activities on client device 101, CPU usage measurer 310 of behavior monitoring program 103 keeps track of the amount of CPU resources spent by program 103 to monitor the activity. This CPU usage measuring occurs at step 506.

At step 508 a process report is generated by behavior monitor program 103. This report (e.g., process report 104 in FIG. 1) is based in part on the CPU usage data as measured in step 506. The process report is transmitted to feedback server 103 from the client device via a wired connection (e.g., connection 108 in FIG. 1) a wireless connection, or via a physical storage media, such as a USB key or optical disc. The process report is generated and transmitted over a network, if suitable, using report generator 308. Before continuing with step 510, it is useful to note that steps 502 to 508 take place on the client device.

At step 510, feedback server 106 analyzes the process report using report analysis engine 402. Because the process report follows a fixed format described below, the analysis is streamlined and automatic. Feedback server 106 can analyze process reports daily, weekly, or as instructed by the service provider. Process reports may be submitted from different entities (subscribers) and from different geographic areas, feedback server 106, may produce static or summary data, such as the number of companies that suffer from performance issues when behavior monitoring engine is checking all activities of a specific program (e.g., OfficeWriter 7.2), the amount of CPU and memory the program consumed when performance issues occurred, and the like. Report analysis engine 402 may perform numerous steps. It may summarize all the software with performance issues reported from the client followed by determining which specific procedures (i.e., software applications) are causing performance issues on the client. It may then cross reference the process report with the summary to determine the severity of the performance issue with each software application, such as the number of entities suffering from it, the average volume of resources consumed, average time it effected the entity, and the like. This may be followed by sorting the process by the severity of the performance issue. Information relating to the process is summarized, including data such as publisher of the process (software program), such as publisher, version number, patch number, digital signature, and the like. The summary information may then be compared with historical data. Based on this comparison, table may be tabulated and charts may be created to assist the service provider in focusing on the critical information of the process report. Once the analysis is complete, at step 512 employees of the service provider operating feedback server 106 (e.g., "malware pattern" analysis team) create an official exception list. The official (i.e., most recently updated) list is created using the judgment and expertise of these employees, taking into consideration the analysis compiled by analysis engine 402. As is known in the art, an official exception list may be in various formats and list 110 of the present invention is likely not different from the format of present exception lists. At step 514 the official exception list is transmitted to client devices running behavior monitoring programs.

Figure 6:
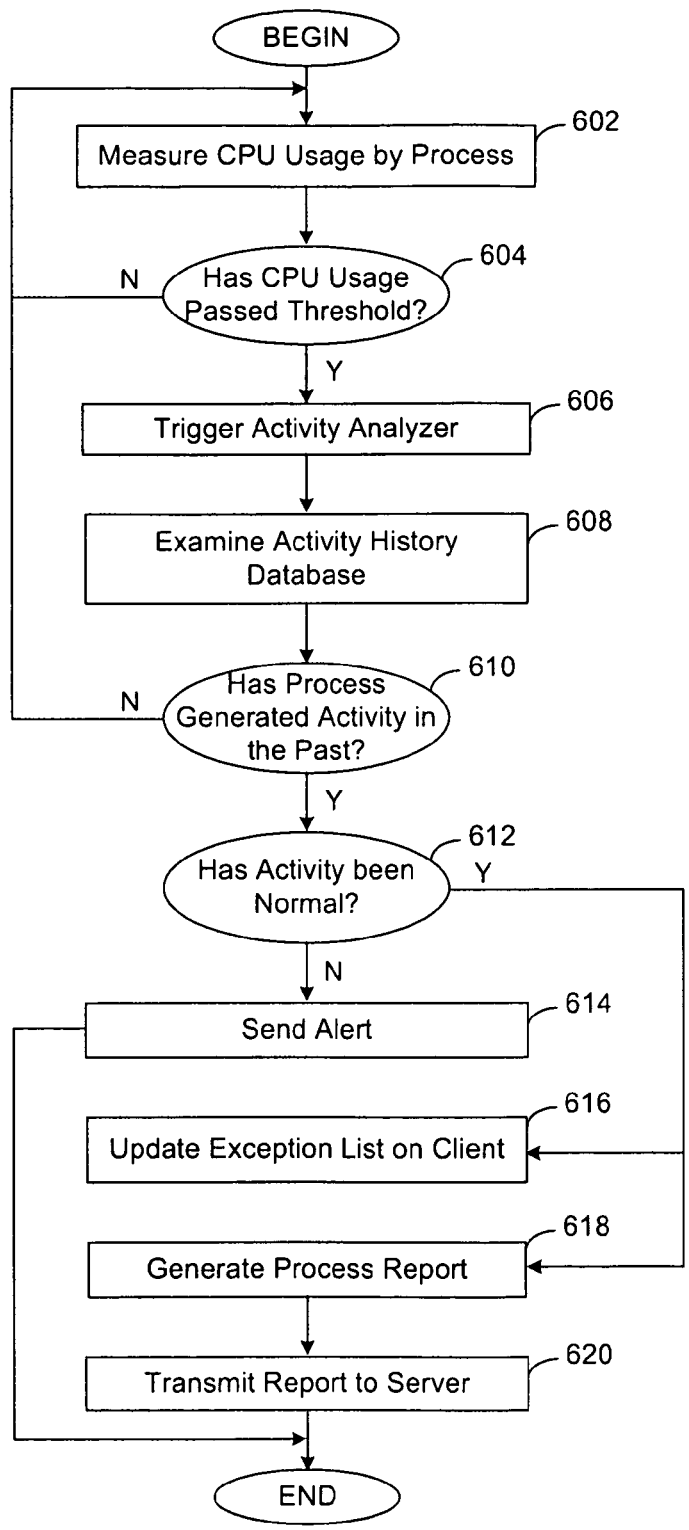
FIG. 6 is a flow diagram of a process of generating a process report on a client computer in accordance with one embodiment.

FIG. 6 is a flow diagram of a process of generating a process report on a client computer in accordance with one embodiment. At step 602 behavior monitor program 103 determines the amount of CPU resources it consumes in checking and gathering statistics on a particular process, uniquely identified by a process identifier. Behavior monitoring program 103 (or similar malware prevention software) running on client 101 essentially examines all activity taking place in the operating system of the device (and may also examine activity in the application layer). It does this to check for unusual, suspicious, or harmful behavior. This type of constant monitoring often requires significant CPU resources, especially if there is a high volume of processes that are executing.

Behavior monitoring program 103 typically monitors numerous processes, each process requiring a certain percentage of the monitor's total CPU usage. If there are five processes on the client and each one takes up 20% of the behavior monitor's CPU usage, the monitor is operating (i.e., monitoring) at "full capacity" and is likely using a significant amount of CPU resources on the computing device. Ideally, the amount of CPU cycles used by the behavior monitoring program itself for monitoring processes should be kept to a minimum. At step 602 the behavior monitor measures the amount of monitoring it is doing for each process. In one embodiment, this self-CPU measuring results in a value (which can be represented as a percentage) for each process that is being monitored (e.g., process A: 16%, process B: 12%, process C: 25%, process D: 4%, etc.).

At step 604 the behavior monitor determines whether CPU usage of any of the processes being monitored exceeds a threshold percentage. This is done by CPU usage measurer 310. For example, if the threshold is 32.5%, and the behavior monitor must expend more than this percentage to monitor a particular process, that process is flagged as a "high CPU" process, although monitoring of its activities or events will continue. The behavior monitoring program keeps monitoring until it reaches step 612, described below. If there are no processes exceeding the threshold, control returns to step 602 and CPU usage measuring continues. If there is a process whose monitoring exceeds the CPU usage threshold, at step 606 activity analyzer 306 is triggered. Activity analyzer 306 evaluates the high CPU process and determines whether it should be placed on the exception list only for that client device and included in process report 104 sent to feedback server 106.

At step 608 activity analyzer 306 examines activity history database 204. In one embodiment, database 204 may use the process identifier as a unique key or index. As noted above, data in database 204 indicates whether a process (which has previously executed on the client since client boot up) has generated normal behavior or malicious/suspect behavior. In one embodiment, all processes that run after client boot up will have a record in database 204. At shutdown all data is deleted except critical data indicating whether a process is normal or malicious. Examples of critical data include user exception lists, malicious activity records, and the like. If the process generated malicious behavior that violated some behavior monitor policies in the past, database 204 may also store data on events comprising the process. It may also store data on the policy that the process violated, such as a policy identifier.

At step 610 activity analyzer 306 determines whether the flagged high-CPU process has generated any activity on the client in the past (since boot-up) by examining activity database 204. The process ID of the flagged process may be used as a key to search the database (e.g., if the database is relational, the unique key may be the process ID and each record may contain data on a single process). If there is no record in database 204 corresponding to the flagged process, control returns to step 602 where the behavior monitor continues measuring CPU usage. The reason for allowing the monitoring of a process that has no activity history on the client and is a high CPU process to continue, even though the process is consuming CPU resources, is because it is an unknown process and may still be shown to be in violation of a policy, but has not been detected as such yet. Therefore, it safer to keep monitoring instead of trying to limit or cut off its CPU consumption, even if it is temporarily excessive.

If it is determined at step 610 that the process has in the past generated activity on the client and, thus, has a record in activity history database 204, control goes to step 612. At step 612, activity analyzer 306 checks whether the activity was normal behavior. As noted above, in one embodiment, this may be done by checking a binary field that indicates whether the process at any time generated activity that violated a policy (e.g., a "0" may indicate all normal activity and a "1" may indicate that the activity was in violation of a policy). If the process generated malicious activity in the past, control goes to step 614 where an alert is displayed to the user. The behavior monitoring may keep monitoring until the process triggers a policy violation. In another embodiment, the process may be terminated.

If the activity was previously evaluated as normal, in one embodiment, control goes to steps 616 and 618. This may occur concurrently or one may happen shortly before the other (the sequence is not critical). At this stage activity analyzer 304 has determined two conditions: that the high-CPU process has generated activity in the past (i.e., has some history on the client) and that the activity has all been non-violative of a policy, that is, it's been normal. Having met these two conditions, the process is considered eligible to be placed on exception list 110 of the client. At step 616 exception list 110 stored is updated with the process that passed the two conditions. This may be characterized as a "temporary" solution to the immediate problem on the client device. Recall that the process was flagged because of the excessive CPU usage it was causing by the behavior monitor. However, given that it is a normal, safe process, by placing it on the exception list for that client's behavior monitoring program right away (step 616), the behavior monitor will stop monitoring the process and save CPU resources. This updating of the exception list is performed by list update module 304 which temporarily updates the list. This temporary, ad hoc update is symbolized by the dashed lines connecting analyzer 306 and list 302. This is a temporary solution because the exception list is only being updated on that particular client and eventually may not necessarily make it on to the official exception list that is sent by the service provider to all its behavior monitoring program subscribers.

At step 618 report generator 308 updates the process report with the process, generates a report, and transmits it to feedback server 106. In other embodiments, report generator 308 may be included or be a sub-component of activity analyzer 306. As described above, process report 104 contains information describing the behavior of the process and basic data on the process itself. For example, the report may indicate the importance or priority of the process, if such information is available, or may contain data on where the process is from, such as its publisher or its source. In one embodiment, the report format may include: application name/version (in which the process operates); publisher of the application; a digital signature of the process, a checksum of the process, a performance impact level (1-5, where a "5" indicates that the process had a significant impact on CPU usage), and, if needed, other signatures of the process.

At step 620 process report 104, which, in one embodiment, may contain data on processes that were analyzed by activity analyzer 306 in the same manner, is transmitted to the feedback server. The frequency of this transmission may vary and depend on the type of client device, its capabilities, or by settings configured by the user or by the malware service provider. A process report may have only one process listed and may be sent each time a (single-process) report is generated, that is, the device does not wait for a certain length of time or for other processes to make it on the report. The report is sent immediately if the network is enabled. If it is not enabled and reports have accumulated, the behavior monitor may send multiple reports at a time. After step 620 the process of generating process report 104 and providing a temporary solution to the CPU usage issue on the client device is complete.

Figure 7:
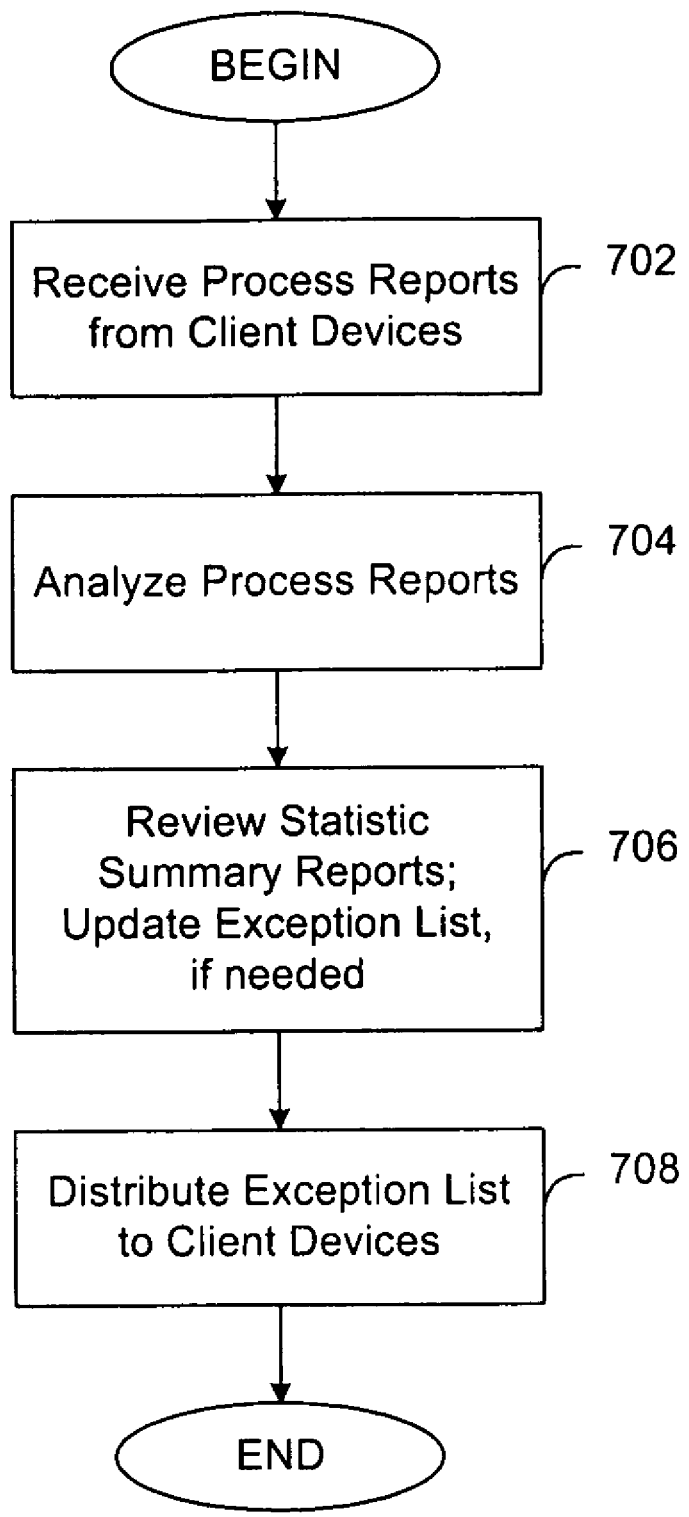
FIG. 7 is a flow diagram of a process for creating an official exception list on a feedback server and distributing the list to clients in accordance with one embodiment.

FIG. 7 is a flow diagram of a process for creating an official exception list on feedback server 106 and distributing the list to clients in accordance with one embodiment. At step 702 feedback server 106 receives process report 104 from a client. As noted, different devices may send reports (some of which may have information on only a single process) at various frequencies. However, feedback server 106 is always prepared to receive process reports from clients. Reports 406 are stored in storage area 404 as shown in FIG. 4. At step 704 a report is analyzed by report analysis engine 402. This is not part of a behavior monitoring program, but rather a component operated by the service provider. The analysis performed at this step is automated and creates a statistics summary. Data in the reports are configured in a specific, uniform format. Because of the uniformity, analysis engine 402 is able to automatically perform the analysis and create a summary report containing relevant statistics summarizing processes contained in the report. A statistics summary report may be specific to one process. In one embodiment, a statistics summary may include application names/versions, geographic regions (of the source of the process or application), customer or subscriber names, the number of other behavior monitors reporting the same process, and the average performance impact of this process (e.g., the average of all the values between level 1 and 5 received in the reports). A sample statistics summary report created by analyzing reports from 500 client devices relating to a specific process in an application called "TestSample.exe," version 1.2.4 may look like the report below:

<Application name="TestSample.exe" version="1.2.4">
<Average Performance Impact level>3.7</Average Performance Impact level>
<Total Number>500</Total Number>
<Publisher>Tester</Publisher>
<Customer Region="JP">Sony</Customer>
<Customer Region="CH">Lenovo</Customer>
<Customer Region="US">Oracle</Customer>

One of the purposes of creating the statistics summary report is to provide service provider employees (e.g., members of a pattern analysis team) with a resource they can use to facilitate analysis of consolidated data from processes which may be received from hundreds or thousands of client devices. At step 706 the service provider reviews the statistics reports from analysis engine 402 and decides whether to add one or more processes to official exception list 408. At this step, the service provider uses its expertise and judgment in deciding whether to include a process in the official exception list. Although the process was put on the "temporary" exception list on the client device when it was first considered eligible (step 616 of FIG. 6), that was intended as a solution to cure the immediate CPU usage issue on a specific client and was not meant to be a permanent solution. Factors that may be used by the service provider to decide whether to include the process on the official exception list may vary. Some factors may include the average performance impact of the process (e.g., the higher it is, the more likely it will make it on the official list) or the number of client devices reporting the process. Another important factor may be the number of geographic regions that reported the process. Balancing these and other factors requires judgment and discretion of human experts. Once a process is on an exception list, the behavior monitor program will not monitor the activity of that process; it will assume that it is safe. Thus, service provider employees make the final decision as to which processes go on the list.

Once the official list is finalized, it is disseminated to behavior monitoring service customers/subscribers. These customers may include some who are not participating in the process report generation and transmission aspect of the invention (the process described in FIG. 6). They may only receive final official exception lists and not be involved in determining which processes go on the list.

Figure 8:
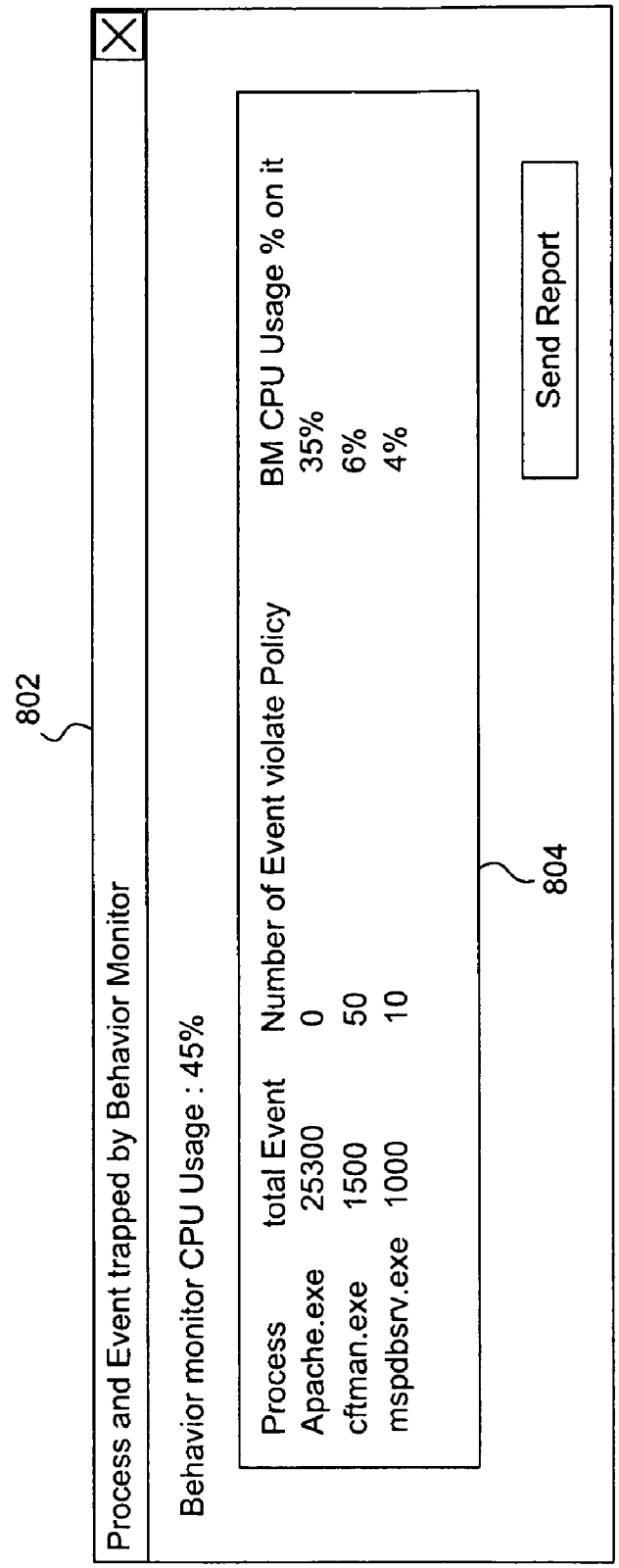
FIG. 8 is a screen shot of behavior monitoring software executing on a client device in accordance with one embodiment.

FIG. 8 is a screen shot of behavior monitoring program executing on a client device in accordance with one embodiment. A screen shot 802 shows overall behavior monitor CPU usage and CPU usage of specific processes that have either completed or are in progress. Screen shot 802 shows "Behavior Monitor CPU Usage," which in the example shown is "45%." As described above, behavior monitoring program uses CPU resources of the client device. In this example, the behavior monitor software is using 45% of the client device's CPU resources. In a window 804, there are four columns of data: Process, Total Events, Events in Violation, and CPU Usage. The Process column lists the name of the process. In other embodiments, a unique process ID may also be displayed. The Total Event column displays the number of events that comprise the process (a process is a sequence of discrete events). The Events in Violation column shows the total number of events in the process that violated one or more malware detection policies. The last column, CPU Usage %, displays the percentage of the CPU (or processor) resources used by the specific process. The total of the percentages in these columns equals the total CPU usage percentage of the behavior monitor (e.g., 45%=35%+6%+4%). In the example shown, the Apache.exe process accounts for 35% of the monitor's total CPU usage and has no events that violate any policies. Thus, it is likely that the Apache.exe process will be temporarily placed on the client's exception list and will be in process report 104 sent to feedback server 106. Whether Apache.exe makes it on official exception list 110 will be up to the service provider. Screen shot 802 allows the customer to see how much of the CPU resources are being used by the behavior monitoring program and to get more specific information on which processes are using the most CPU cycles. The service provider may also be able to remotely log on to the client device and see this same information to help assist with issues the customer may be having with the behavior monitoring software.

Figure 9A:
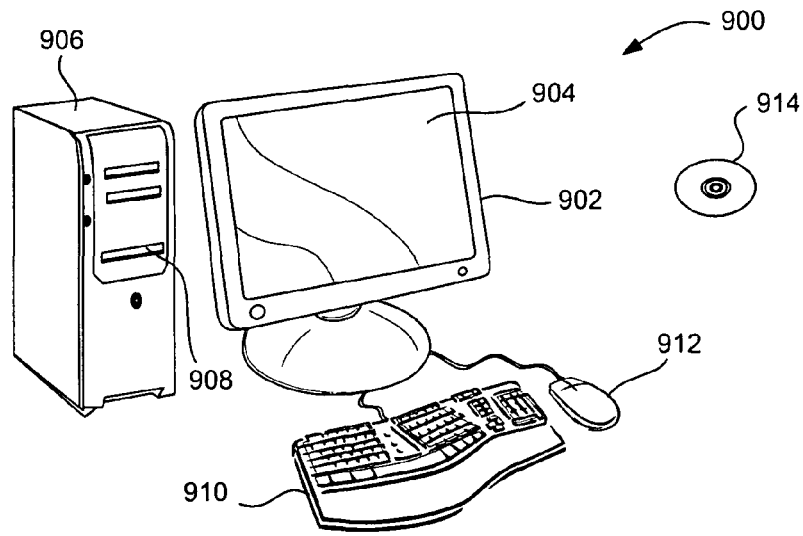
FIGS. 9A and 9B illustrate a computer system suitable for implementing embodiments of the present invention.
Figure 9B:
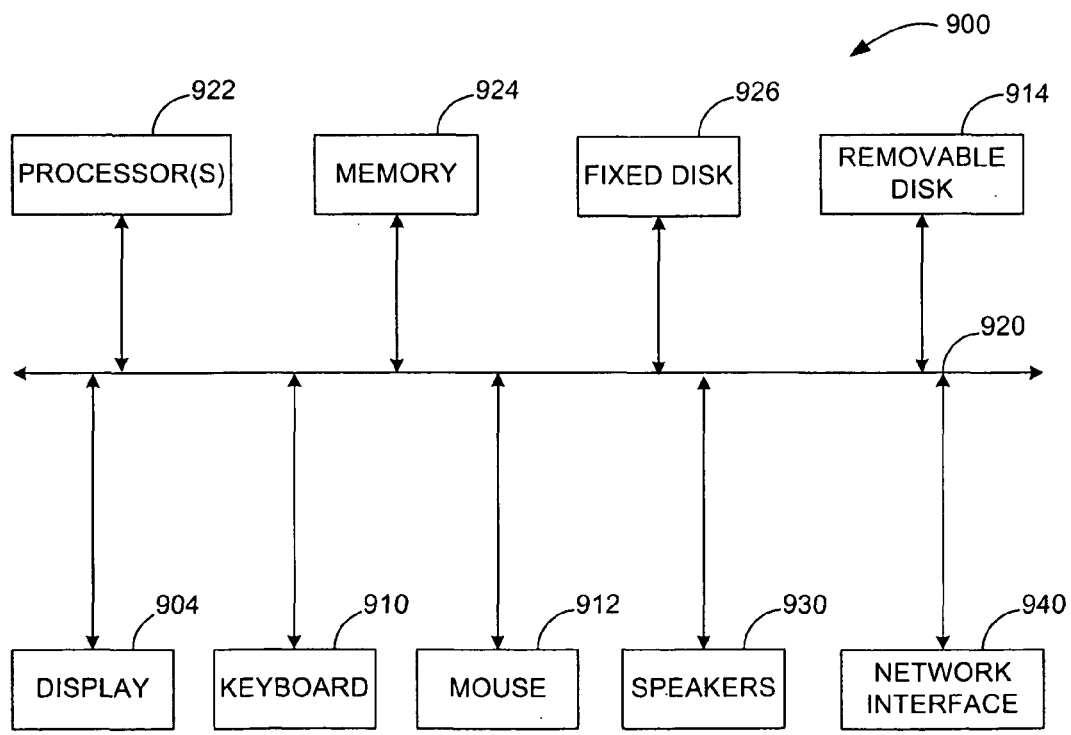

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone, handset or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of updating a process exception list for use in a malware behavior monitoring program, the method comprising:
    receiving a plurality of client process reports from a first plurality of client devices having malware behavior monitoring programs, wherein a client process report includes malware behavior monitoring program CPU usage data relating to one or more processes executing on a client device;
    creating a statistics summary report from analyzing the plurality of client process reports;
    determining whether to add a process to a final exception list wherein the determination is made using the statistics summary report by examining an average performance impact of the process across multiple client devices and a number of client devices reporting the process; and
    distributing the final exception list to a second plurality of client devices for use with malware behavior monitoring programs, wherein the final exception list identifies processes that are to be excluded from monitoring acts by the malware behavior monitoring programs, wherein on a specific client device, a temporarily updated process list is replaced with the final process exception list.

2. A method as recited in claim 1 wherein the temporarily updated process list alleviates high CPU usage on the specific client device by excluding processes on the temporarily updated process list from monitoring.

3. A method as recited in claim 1 further comprising:
    examining a number of geographic regions that reported the process.

4. A method as recited in claim 1 wherein a client process report includes an application name, an application publisher, and CPU usage data.

5. A method as recited in claim 1 wherein a statistics summary report includes one or more application names, one or more geographic regions of origin, and a number of other malware behavior monitor programs reporting the process.

6. A method as recited in claim 5 wherein a statistics summary report further includes an average performance impact of the process.

7. A method as recited in claim 1 further comprising:
    determining one or more specific processes creating CPU usage that passes a threshold.

8. A method as recited in claim 1 further comprising:
    sorting the processes based on a severity of performance.

9. A feedback server supporting a malware behavior monitoring program comprising:
   a processor;
   a network interface;
   a process report analysis engine for examining a client process report and generating a statistics summary report;
   a memory storage area storing:
      a plurality of client process reports received from a plurality of client devices;
      a plurality of statistics summary reports generated by the process report analysis engine; and
      malware behavior monitoring exception lists, wherein said lists are updated based on evaluation of the plurality of statistics summary reports, and examining average performance impact of the process across multiple client devices and a number of client devices reporting the process, wherein said exception lists identify processes that are to be excluded from performance monitoring and wherein said exception lists replace temporarily updated exception lists stored on a plurality of client devices.

10. A feedback server as recited in claim 9 wherein a client process report includes an application name, an application publisher, and CPU usage data.

11. A feedback server as recited in claim 9 wherein a statistics summary report includes one or more application names, one or more geographic regions of origin, and a number of other malware behavior monitor programs reporting a process.

12. A method of malware behavior monitoring on a computing device, the method comprising:
   identifying a high-CPU process whose monitoring by a malware behavior monitoring program requires more than a threshold amount of CPU resources and has previously generated activity on the computing device;
   determining whether the previously generated activity is normal activity;
   if the previously generated activity is normal activity, updating a temporarily updated exception list in the malware behavior monitoring program to include the high-CPU process, thereby instructing the malware behavior monitoring program to bypass monitoring of the high-CPU process on the computing device;
   generating a process report containing process-specific data including CPU usage data;
   transmitting the process report to a feedback server, wherein the process report is used to update an official exception list on the feedback server maintained by a malware service provider;
   examining average performance impact of the process across multiple client devices and a number of client devices reporting the process;
   excluding any processes on the temporary exception list from monitoring by the malware behavior monitoring program;
   receiving a final exception list from the feedback server; and
   replacing the temporarily updated exception list with the final exception list.

13. A method as recited in claim 12 wherein the process report is used at the feedback server to create a statistics summary report which is examined to update the official exception list.

14. A method as recited in claim 12 further comprising:
   measuring CPU usage caused by the monitoring of the high-CPU process.

15. A method as recited in claim 12 wherein updating an exception list in the malware behavior monitoring program with the high-CPU process is a temporary solution to a performance issue caused by the high-CPU process.

16. A method as recited in claim 12 wherein determining whether the previously generated activity is normal activity further comprises:
   examining an activity history database.

17. A method as recited in claim 12 further comprising:
   determining on the feedback server one or more specific processes creating CPU usage that passes a threshold on the computing device; and
   sorting the processes based on a severity of performance.

18. A method as recited in claim 13 further comprising:
   comparing the statistics summary report with relevant historical data on the feedback server.

19. The method as recited in claim 1, wherein the performance monitoring programs compare running processes with known malware signatures or patterns to identify suspicious processes, except for processes on the final exception list or on the temporarily updated process list.

20. The method as recited in claim 1, wherein the client devices include mobile phones.

21. The method as recited in claim 1, wherein the distributing includes distributing the final exception list to devices identified in a directory of subscribing client devices.

22. The feedback server as recited in claim 9, wherein the process report analysis engine is designed to summarize all the software with performance issues reported by clients by determining which specific software processes are causing performance issues.

23. The feedback server as recited in claim 22, wherein the process report analysis engine is further designed to cross-reference a process report with the summary to determine severity of the performance issue with each software process.

24. The feedback server as recited in claim 23, wherein the cross-referencing includes determining the number of entities suffering from the performance issue.

25. The feedback server as recited in claim 23, wherein the cross-referencing includes determining the average volume of resources consumed.

26. The feedback server as recited in claim 23, wherein the cross-referencing includes determining the average time the performance issue affected the entity.

27. The feedback server as recited in claim 23, wherein the process report analysis engine is further designed to sort each process by severity of the performance issue.

28. The feedback server as recited in claim 23, wherein the summarizing includes tracking a published of software with performance issues.

29. The feedback server as recited in claim 23, wherein the summarizing includes tracking a version number of software with performance issues.

30. The feedback server as recited in claim 23, wherein the summarizing includes tracking a patch number of software with performance issues.

31. The feedback server as recited in claim 23, wherein the summarizing includes tracking a digital signature of software with performance issues.

32. The method as recited in claim 12, wherein the feedback server operates under the control of an entity that is the same as an entity controlling the malware behavior monitoring program.

* * * * *